June 23, 1931.  R. K. WINNING  1,810,994
STEERING COLUMN SWITCH
Filed May 20, 1927
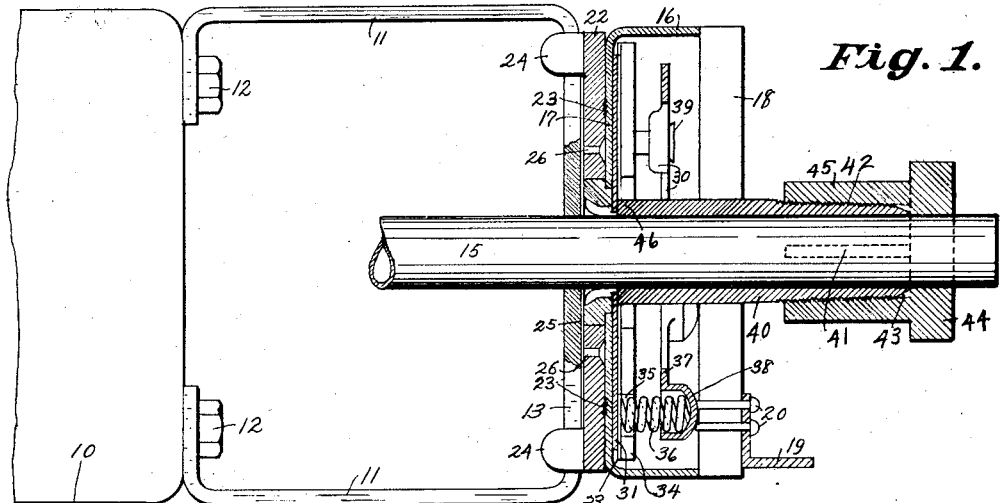
Fig. 1.
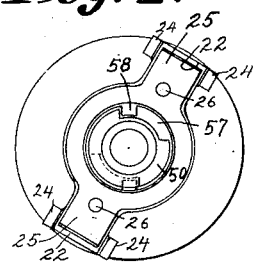
Fig. 2.
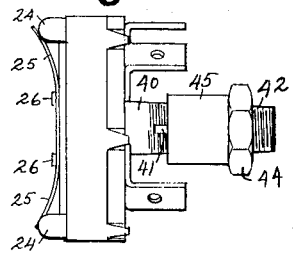
Fig. 3.
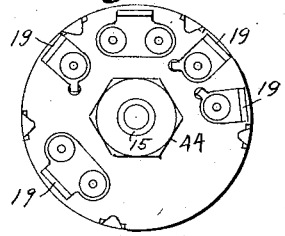
Fig. 4.
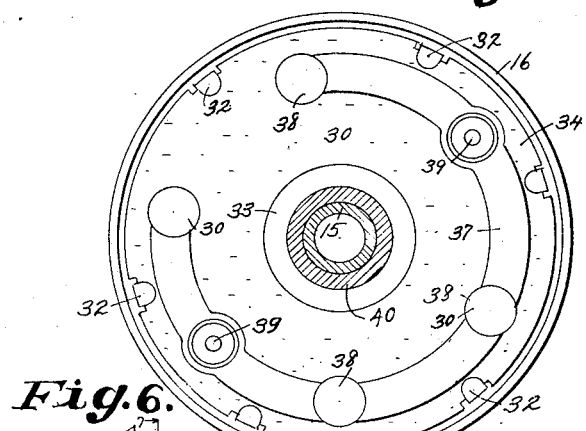
Fig. 5.
Fig. 6.
Fig. 7.
INVENTOR
Robert K. Winning
BY
Erwin, Wheeler & Woolard
ATTORNEY
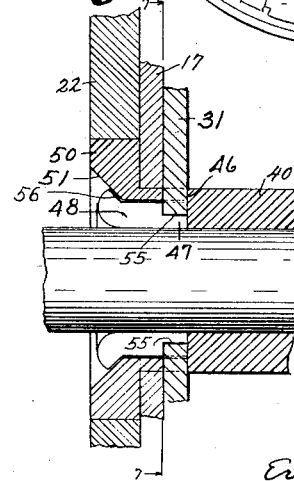

Patented June 23, 1931

1,810,994

UNITED STATES PATENT OFFICE

ROBERT K. WINNING, OF WAUWATOSA, WISCONSIN, ASSIGNOR TO CLUM MANUFACTURING COMPANY, OF MILWAUKEE, WISCONSIN, A CORPORATION OF WISCONSIN

STEERING COLUMN SWITCH

Application filed May 20, 1927. Serial No. 192,830.

This invention relates to improvements in steering column switches.

It is the object of the invention to provide a novel and simplified mounting for a switch mechanism and switch casing at the lower end of a steering column in an automobile, the switch structure being so organized as to require connection only to the actuating shaft, the switch casing being keyed but otherwise unsecured to the steering column.

In the drawings:

Figure 1 is an axial section through a switch embodying this invention, illustrating the application thereof to an automobile steering column.

Figure 2 is a view of the end of the switch casing which is adjacent the column.

Figure 3 is a side elevation of the assembled switch, apart from its mounting.

Figure 4 is a view of the opposite end of the switch casing.

Figure 5 is a view looking into the end of the switch mechanism with the terminal head removed to expose the moving contactor.

Figure 6 is an enlarged detail in section showing the driving connection to the switch actuator.

Figure 7 is a detail taken in section in a plane indicated at 7—7 in Figure 6.

Like parts are identified by the same reference characters throughout the several views.

The device herein disclosed is particularly designed for use in connection with a certain type of steering column or like mounting which is illustrated in Figure 1. 10 represents the lower end of the steering column and 11 is a bridge member of rectangular outline and made of a strap of which the ends are bolted to the steering column at 12. The space between the end of the column and the intermediate portion 13 of the bridge member provide clearance for the operation of certain of the steering column controls which are unnecessary to an understanding of the present invention.

It will be understood by those skilled in the art that the steering shaft, which is not here illustrated and which forms no part of the present invention, operates the dirigible axle of the vehicle in the usual manner. The purpose of the present structure is to enable the lighting switch to be mounted at the lower end of the steering column and operated by controls extending through the tubular steering shaft in the same manner in which controls for throttle and timing have heretofore been extended through such shaft. This arrangement makes it possible to locate the control lever for the lighting switch at the top of the steering column in association with the throttle and timing levers where it is conveniently accessible.

The particular steering column control for the operation of the switch to be described herein comprises a shaft 15 which happens to be tubular and in accordance with the object of the invention it is proposed to provide a switch mechanism which, when secured to this shaft, will require no further connections for its mounting to render it operative. A further advantage of the particular switch to be disclosed consists in the fact that it does not interfere with the use or operation of a further control which may be guided within the tubular shaft 15 and projected entirely through the switch mechanism to a point therebeyond.

The switch casing 16 is a cup-shaped member having an integral front wall 17 and closed at its rear in the usual way by terminal head 18 carrying the terminals 19 and terminal contacts 20.

The mounting strip 22 is secured at 23 by welding or riveting or otherwise to the front wall 17 of the switch casing. At each of its ends this strip is provided with laterally spaced projecting ears 24 which are adapted to engage the side margins of the bridge member portion 13 to key the switch casing against rotation in either direction while permitting it to center and adjust itself with respect to the shaft 15 whereby it is driven. A flat spring 25 is riveted to the anchoring strip at 26 and has a normal arcuate curve as shown at Figure 3 so that when it is forced flat, as shown in Figure 1 through engagement with the bridge member 11, it prevents rattling and takes up all slack between the switch and the steering column.

The moving contactor within the switch is designated generally by reference character 30 and corresponds to that illustrated in my co-pending application No. 53,507. It includes a driving plate 31 having ears 32 which engage the dielectric disks 33 and 34 as shown in Figures 1 and 5. Disk 34 is provided with apertures at 35 to receive the several contact springs 36 which seat against the unapertured surface of disk 33. These springs support an arcuate contact strip 37 having semi-globular embossed contacts 38 at suitable intervals and anchored at two or more points by means of the headed posts 39. The contact buttons 38 interact with the fixed terminal contacts 20 in the terminal head 18 in a manner well understood and not requiring a further description for the purposes of the present invention.

The manner in which motion is transmitted from the driving shaft 15 to the moving contactor of the switch will now be described.

The driving member of the switch proper comprises a driving sleeve 40 of a size to receive the shaft 15 with a close fit. The sleeve or tube 40 is slotted at 41 near its exposed end at the rear of the switch and it is provided at 42 with a tapered threaded portion terminating at the end of the tube in a more abruptly tapered shoulder 43. A jamb nut 44 has a barrel 45 with a tapered thread complementary to the threaded portion 42 of the tube 40. At the end of the thread is an abrupt taper adapted to engage the taper 43 so that despite any carelessness in the formation of the two sets of threads, the shouldered surfaces must ultimately bring about a clamping engagement of driving tube 40 upon shaft 15.

The driving tube 40 passes centrally through the terminal head 18 of the switch and through the contactor to the drive plate or disk 31. From this point onward toward the front of the device, the driving tube or sleeve is reduced in diameter, providing a shoulder at 46 in engagement with the drive plate. The reduced extremity of the driving tube is also transversely slotted from its end to the shoulder as shown at 47, leaving a pair of arcuate legs 48 to project along drive shaft 15.

Concentric with the outer peripheral portions of legs 48 is the annular stop member 50 which has a beveled face at 51 and which is slotted at its rear end as shown at 52, leaving a concentric pair of arcuate legs at 53 which are similar to legs 48 in arcuate extent, but which project in the opposite direction. The driving plate 31 of the switch actuator is provided with tongues 55 which project radially toward the axis of drive shaft 15 into the registering slots 52 and 47 of stop plate 50 and driving tube 40 respectively. These tongues key the driving plate 31 to the driving tube 40 to receive motion therefrom and also serve to transmit motion to the stop plate 50. The entire assembly is maintained in the above described relation by upsetting the legs 48 of the driving tube over the beveled face 51 of the stop plate as shown at 56.

The periphery of the stop plate 50 is notched at 57 as shown in Figure 2 and the mounting bar 22 of the switch is provided with the tongue 58 which is received into notch 57 and is abutted by the shoulders at the ends of the notch to limit the possible rotation of the switch mechanism.

The driving shaft 15 is usually so mounted in the steering column that it cannot move axially toward the foot of the column and the switch, but can move axially toward the head of the column. It will be observed that the present switch mounting not only mounts the switch, but also secures shaft 15 when a single connection is established between the switch and shaft. This connection will also be observed to be independent of the relative length of shaft 15 so that the product of the switch manufacturer need not conform in detail to that of the manufacturer of the steering gear.

Figure 3 shows the switch as it is furnished complete. In order to mount such a switch, it is only necessary to slip it upon shaft 15 which is passed through the driving sleeve 40 of the switch and projects from the rear thereof. As the switch mechanism is pushed onto shaft 15, the upwardly curving ends of spring 25 encounter portion 13 of the bridge member and the spring is gradually flattened. In the ultimate position of the switch, as shown in Figure 1, the spring will be substantially flat and the ears of the switch mounting strip 22 will be engaged upon either side of the bridge member to fix the rotative position of the switch. With the parts in this position, the jamb nut 44 is turned down to tighten the drive tube 40 of the switch onto shaft 15 thereby establishing a driving connection between these parts and also maintaining the switch casing in a properly interlocked relation to the mounting bridge 11. Spring 25 not only keeps the casing from rattling, but subjects shafts 15 to tension which holds it in its proper place in the steering column. It is particularly to be noted that the switch casing is floated from the shaft which operates the switch mechanism, in the sense that the switch casing may move laterally upon the bridge member to adjust itself to the position of its driving shaft. In this way alignment of the parts is inherently the result of the construction chosen and no accuracy of mounting is required.

When shaft 15 is rotated the moving contractor within the switch casing turns with it due to the splined engagement of tongues 55 with the slot 47 in the end of the driving tube. Contacts interact with the terminals in the usual manner and the degree of movement is limited through the interaction of stop member 50 with tongue 58 of the anchorage strip or mounting plate 22 as above described.

I claim:

1. The combination with a driving shaft and a relatively fixed member adjacent thereto, of a switch casing including a terminal head with housed contacts interlocked with said member against rotative movement about the axis of said shaft and freely disengageable from said member in an axial direction, a switching mechanism including a movable part housed within said casing and operatively arranged for interaction with said contacts and provided with a connection to said shaft, said connection comprising a means for maintaining said casing in engagement with said member.

2. A switch mechanism including a spaced mounting plate and terminal head, an annular switch contactor therebetween, and a driving tube opening through said mechanism affording communication through said plate, said contactor, and said head and adapted to receive a shaft extending completely through said mechanism.

3. A switch mechanism including the combination of a casing including a spaced wall and terminal plate; means connecting said wall and terminal plate; an annular moving contactor confined between said wall and terminal plate and enclosed by said casing; a tube affording communication through said wall, said contactor, and said terminal plate; and a coupling member on said tube, said tube being axially fixed with reference to said wall and connected to said contactor, a support for said wall, and anchorage means on said wall axially disengageable from said support and adapted to maintain said wall non-rotatable with respect thereto, said tube comprising the sole means for maintaining said wall anchorage means engaged with said support.

4. The combination with a switch mechanism including a front wall, a terminal head, an annular movable contact device therebetween, means connecting said front wall and terminal head, of a drive tube for said movable contactor operatively connected for rotation therewith and affording an opening through said mechanism, said wall and head being provided with concentric openings, means securing said tube against axial movement with reference to said wall, and means connected with said wall and projecting in a position to restrain the rotative movement thereof.

5. The combination with a driving shaft and a relatively fixed member, of a switch casing in floating engagement with said member, a spring interposed between said casing and member, a movable contactor within said casing, and a driving element for said contactor coupled to said shaft in a position maintaining said spring under compression and said casing in engagement with said member, said element being substantially fixed axially with reference to said casing.

6. The combination with a driving shaft and a relatively fixed member, of a switch casing in floating engagement with said member, a spring interposed between said casing and member, a movable contactor within said casing, and a driving element for said contactor coupled to said shaft in a position maintaining said spring under compression and said casing in engagement with said member, said element comprising a tube provided with a coupling and secured against axial movement with reference to a portion of said casing.

7. The combination with a steering column, a bridge member, and a driving shaft projecting beyond said bridge member, of switch mechanism including a casing in floating engagement with said bridge member, and a moving contactor having a casing bearing portion and a portion in connection with said shaft and adapted thereby to maintain such engagement.

8. A switch mechanism including a mounting member, a terminal head, a moving contactor associated with said head and said member, a prong projecting axially from said member, and a driving sleeve connected with said contactor and provided with a clamp.

9. A switch mechanism adapted to be mounted on the bridge member and control shaft of a steering column, said mechanism comprising a mounting plate provided with means for interengagement with such a member, a terminal head non-rotatively connected with said mounting plate and provided with terminal contacts, a moving contactor between said mounting plate and terminal head, and a driving sleeve operatively connected for the rotation of said contactor and provided with a clamp for engagement with such a shaft, whereby to be adapted to receive movement from said shaft and to secure said mounting plate in engagement with such a member.

10. A device of the character described comprising a mounting plate provided with axially projecting prongs, a terminal head spaced therefrom and connected therewith, a moving contactor between said mounting plate and terminal head and including a driving disk and a floating contact, together with a driving sleeve connected with said disk and provided with means for securing it upon a driving shaft.

11. A device of the character described including a switch casing, anchorage means therefor, a terminal head connected with said casing, a contactor actuating disk within said casing, contacts connected with said disk for actuation therefrom, and a sleeve connected with said disk within said casing and projecting therefrom, said sleeve being provided exteriorly of said casing with a contractile clamp.

12. A device of the character described including a casing and provided with anchorage means and a terminal head, a contact driving disk within said casing, contacts arranged to be actuated by said disk and associated with said terminal head, a sleeve connected with said disk and projecting from said casing, said sleeve being slotted at its end, and a jamb nut in tapered threaded connection with the slotted end of said sleeve.

13. A device of the character described comprising the combination with a casing having anchoring prongs projecting from its face, of a spring associated with such face and having a thrust axially therefrom, switching mechanism mounted in said casing and including a movable part, a sleeve connected with said part and projecting from said casing, and a coupling on said sleeve.

14. In a device of the character described, the combination with a casing having a terminal head and a front wall, of switching mechanism associated with said terminal head within said casing and including a driving disk adjacent said wall having a central aperture and tongue projecting centrally from the margin thereof, and a driving sleeve projecting into said casing and provided with a recess to receive said tongue.

15. In a device of the character described, the combination with a moving switch contactor including a driving disk apertured and provided with a tongue projecting centrally from the margin of the aperture, of concentric members at each side of the face of said disk having registering notches to receive said tongue and connected thereby for simultaneous rotation with each other and said disk.

16. In a device of the character described, the combination with contactor mechanism including a driving disk, of a sleeve for the actuation of said disk provided with a shoulder abutting the face thereof, an annular member opposed to said shoulder, and means connecting said disk, said sleeve and said member for simultaneous rotation.

17. The combination with a steering column, a bridge member and a driving shaft projecting beyond said bridge member, of switch mechanism including fixed contacts, a support for said fixed contacts in sliding non-rotative engagement with the bridge member, and a moving contact provided with an actuator rotatively fixed with reference to said support for rotation upon a predetermined axis in relation to said fixed contacts and connected with said shaft to receive rotation therefrom, the sliding connection of said support to said bridge member being adapted to accommodate irregularities in the movement of said shaft.

18. An electric switch comprising a casing provided with a floating mounting to which said casing is secured against rotative displacement, and a fixed contact mounted in said casing, in combination with a moving contactor rotatable upon a predetermined axis in said casing, and means for driving said contactor from which said casing is positioned respecting said mounting.

19. The combination with a steering column, of a switch mechanism including relatively stationary contact parts loosely connected mechanically with the column, a shaft projecting from said column, and movable contact parts connected with said shaft and provided with means fixing the path of movement of said movable parts with respect to said stationary contact parts, whereby all of said parts will take their position from said shaft within the range of movement permitted by the loose connection with said column.

20. In a switch, the combination with contact mechanism including a movable part, a shaft rotatably connected to said part for the operation thereof and provided with a coupling including a member rotatable upon the axis of the shaft, and means providing a positive stop limiting the rotation of the shaft and adapted to receive the torque reduced by rotation of said member.

21. In a switch, the combination with a relatively heavy mounting member and a relatively lighter casing provided with switch contacts and having an apertured end wall connected with said member, of a rotatable contact actuator extending through the aperture of said casing and provided with means interacting with said mounting member in the plane thereof and adapted to limit the rotation of said actuator.

22. In a switch, the combination with a case and a transversely slotted tube comprising a contact actuator, of switch mechanism within the case including a movable contactor, and means connecting said contactor with said shaft comprising a tongue engaged in the slot of the shaft.

23. In a switch, the combination with spaced interconnected mounting and terminal contact members and a contactor movable therebetween, of means loosely fixing said mounting member against rotation, and a tubular shaft rotatably secured against axial and lateral displacement with respect to said members and operatively connected with said contactor, said shaft being provided with a coupling through which it may be driven, and the position of said switch may be fixed within the limits permitted by the looseness of its mounting.

ROBERT K. WINNING.